United States Patent
Du

(10) Patent No.: US 11,810,395 B2
(45) Date of Patent: Nov. 7, 2023

(54) OPTICAL FINGERPRINT IDENTIFICATION APPARATUS, ELECTRONIC DEVICE AND FINGERPRINT IDENTIFICATION METHOD

(71) Applicant: SHENZHEN GOODIX TECHNOLOGY CO., LTD., Shenzhen (CN)

(72) Inventor: Canhong Du, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 265 days.

(21) Appl. No.: 16/714,718

(22) Filed: Dec. 14, 2019

(65) Prior Publication Data

US 2020/0342197 A1 Oct. 29, 2020

Related U.S. Application Data

(63) Continuation of application No. PCT/CN2019/084400, filed on Apr. 25, 2019.

(51) Int. Cl.
*G06V 40/12* (2022.01)
*G06V 10/141* (2022.01)
(Continued)

(52) U.S. Cl.
CPC ........ *G06V 40/1382* (2022.01); *G06V 10/141* (2022.01); *G06V 40/1318* (2022.01);
(Continued)

(58) Field of Classification Search
CPC ............. G06K 9/0004; G06K 9/00013; G06K 9/00046; G06K 9/00899; G06F 21/32;
(Continued)

(56) References Cited

U.S. PATENT DOCUMENTS

| 9,177,170 B2 | 11/2015 | Kurihara | |
|---|---|---|---|
| 2006/0115128 A1* | 6/2006 | Mainguet | G06V 40/1335 382/115 |

(Continued)

FOREIGN PATENT DOCUMENTS

| CN | 102567707 A | 7/2012 | |
|---|---|---|---|
| CN | 104221050 A * | 12/2014 | ............. A61B 5/117 |

(Continued)

OTHER PUBLICATIONS

Machine Search translation of KR-100682486-B1, retrived Dec. 5, 2021, 16 pages. (Year: 2021).*

(Continued)

*Primary Examiner* — Matthew C Bella
*Assistant Examiner* — Dennis Rosario

(57) ABSTRACT

An embodiment of the present application provides an optical fingerprint identification apparatus, which includes: at least one non-visible light source, configured to emit non-visible light to a human finger to provide excitation light for fingerprint identification; an optical component, disposed under a fingerprint detecting area of the display screen, and configured to receive signal light scattered and reflected by the human finger; and a fingerprint sensor configured to perform imaging based on the signal light passing through the optical component, where a working wave band of the fingerprint sensor is the same as a light emitting wave band of the non-visible light source, a number of the working wave bands is the same as the number of the light emitting wave bands, and the fingerprint sensor is connected to the non-visible light source, and is configured to control the non-visible light source to actively emit light.

15 Claims, 10 Drawing Sheets

(51) Int. Cl.
*H04N 23/56* (2023.01)
*G06V 40/13* (2022.01)

(52) U.S. Cl.
CPC ......... *H04N 23/56* (2023.01); *G06V 40/1341* (2022.01); *G06V 40/1394* (2022.01)

(58) Field of Classification Search
CPC ...... G06F 2203/0338; G06Q 20/40145; G06V 40/1318; G06V 40/12; G06V 40/13; G06V 40/1324; G06V 40/1341; G06V 40/1382; G06V 40/1388; G06V 40/1394; G06V 10/141; G06V 40/45; G06V 40/40; G06V 10/143; G06V 10/147

See application file for complete search history.

(56) References Cited

U.S. PATENT DOCUMENTS

| | | | |
|---|---|---|---|
| 2008/0267463 A1* | 10/2008 | Yuan | G06V 40/1324 382/124 |
| 2009/0008459 A1* | 1/2009 | Mainguet | G06K 19/073 235/492 |
| 2010/0026453 A1* | 2/2010 | Yamamoto | G06F 21/32 340/5.83 |
| 2011/0102392 A1* | 5/2011 | Fujioka | G02F 1/13338 345/207 |
| 2016/0254312 A1 | 9/2016 | Lee et al. | |
| 2017/0112420 A1* | 4/2017 | Hung | A61B 5/14532 |
| 2017/0261650 A1* | 9/2017 | Powell | G02B 3/0087 |
| 2017/0300736 A1* | 10/2017 | Song | G06K 9/0004 |
| 2018/0000393 A1* | 1/2018 | Hsieh | A61B 5/14552 |
| 2018/0025205 A1* | 1/2018 | Wu | G06V 40/1324 382/127 |
| 2019/0065810 A1 | 2/2019 | Xu | |
| 2019/0157337 A1* | 5/2019 | Lin | H01L 31/167 |
| 2019/0362060 A1* | 11/2019 | Baek | A61B 5/742 |
| 2020/0050818 A1* | 2/2020 | He | G06V 40/1394 |

FOREIGN PATENT DOCUMENTS

| | | | | | |
|---|---|---|---|---|---|
| CN | 108089690 | A | | 5/2018 | |
| CN | 108446677 | A | | 8/2018 | |
| CN | 108629243 | A | | 10/2018 | |
| CN | 108846392 | A | | 11/2018 | |
| CN | 109154961 | A | * | 1/2019 | .......... G02B 6/0055 |
| CN | 109496311 | A | | 3/2019 | |
| CN | 110059523 | A | * | 7/2019 | ............ A61B 5/117 |
| CN | 209640884 | U | | 11/2019 | |
| EP | 3051462 | A1 | | 8/2016 | |
| KR | 100682486 | B1 | * | 2/2007 | |
| WO | WO-2010034848 | A1 | * | 4/2010 | .......... A61B 5/0059 |
| WO | 2018227777 | A1 | | 12/2018 | |
| WO | WO-2019018876 | A1 | * | 1/2019 | ............ G02C 7/083 |

OTHER PUBLICATIONS

Machine translation via Search of WO 2010/034848 A1 to Sanchez et al., May 20, 2022, 24 pages. (Year: 2022).*
Google Translate (translation of IDS of Aug. 21, 2023 of Li Bo, Study on Indirect-contact Collection and Identification of Fingerprint Images), Research on Non-Contact Fingerprint Collection and Identification, translated Sep. 20, 2023, 11 pages. (Year: 2023).*
Li Bo, Study on Indirect-contact Collection and Identification of Fingerprint Images (corresponding to the IDS of Aug. 21, 2023), Jun. 2004 [retrieved Sep. 20, 2023], Optoelectronic Technology & Information, 17(3), pp. 58-61. Retrieved: http://qikan.cqvip.com/Qikan/Article/Detail?id=10181156 (Year: 2004) .*
Maltoni Davide: Handbook of Fingerprint Recognition Second Edition, Dec. 31, 2009, Springer, London, GB, ISBN: 978-1-84882-253-5, p. 388.
Li Bo, "Study on Indirect-contact Collection and Identification of Fingerprint Images", Optoelectronics Technology & Information; Jun. 30, 2004; pp. 58-61; vol. 17(3).

* cited by examiner

OPTICAL FINGERPRINT IDENTIFICATION APPARATUS, ELECTRONIC DEVICE AND FINGERPRINT IDENTIFICATION METHOD

CROSS REFERENCE TO RELATED APPLICATIONS

The present application is a continuation of international application No. PCT/CN2019/084400, filed on Apr. 25, 2019, which is hereby incorporated by reference in its entirety.

TECHNICAL FIELD

The present application relates to the field of information technologies, and in particular, to an optical fingerprint identification apparatus, an electronic device and a fingerprint identification method.

BACKGROUND

With rapid development of science and technology, a fingerprint identification technology has been widely applied to various fields such as a mobile terminal, a smart home. At present, at the time of performing fingerprint identification, visible light with a certain wavelength is adopted to illuminate a biological feature, and a reflected light signal carrying biological feature information is transmitted to a sensor for capturing by utilizing a reflection imaging principle of visible light, and legitimacy of a user identity is confirmed by comparing the captured information with a biological feature registered and stored in advance.

However, a fingerprint sensor can only passively receive a reflected visible light signal for fingerprint identification, thereby limiting flexible selection of a wavelength of excitation light used for imaging.

SUMMARY

Embodiments of the present application provides an optical fingerprint identification apparatus, an electronic device and a fingerprint identification method, which could flexibly select wavelengths of excitation lights used for fingerprint identification, improve an ability to distinguish between real and fake fingers, and further improve safety of fingerprint identification.

In a first aspect, provided is an optical fingerprint identification apparatus applied to an electronic device having a display screen, including: at least one non-visible light source, configured to emit non-visible light to a human finger to provide excitation light for fingerprint identification, where a number of light emitting wave bands of the non-visible light source is at least 1; an optical component, disposed under a fingerprint detecting area of the display screen, and configured to receive signal light scattered and reflected by the human finger and collimate and/or converge the signal light; and a fingerprint sensor, disposed under the optical component, and configured to perform imaging based on the signal light passing through the optical component, where a working wave band of the fingerprint sensor is the same as a light emitting wave band of the non-visible light source, a number of the working wave bands is the same as the number of the light emitting wave bands, and the fingerprint sensor is directly or indirectly electrically connected to the non-visible light source, and is configured to control the non-visible light source to actively emit light.

In one possible implementation manner, the optical fingerprint identification apparatus further includes a filter disposed between the optical component and the fingerprint sensor, and a light passing wave band of the filter is the same as the light emitting wave band of the non-visible light source.

In one possible implementation manner, a number of the non-visible light sources is greater than 1, the number of the light emitting wave bands of the non-visible light source is greater than or equal to 1, a number of light passing wave bands of the filter is equal to the number of light emitting wave bands of the non-visible light source, and the light emitting wave bands are in one-to-one correspondence with the light passing wave bands.

In one possible implementation manner, the electronic device includes a cover glass, and the display screen and the non-visible light source are disposed side by side under the cover glass.

In one possible implementation manner, the non-visible light source is disposed on at least one side of a universal serial bus USB interface of the electronic device.

In one possible implementation manner, the display screen is an organic light-emitting diode OLED display screen.

In one possible implementation manner, the display screen includes a display module and a backlight module, and the backlight module is capable of transmitting the non-visible light emitted by the non-visible light source.

In one possible implementation manner, the optical component includes a collimator array, and the collimator array includes a plurality of collimating holes configured to collimate the signal light and direct the signal light to the fingerprint sensor.

In one possible implementation manner, the optical component includes: at least one lens and a support; the lens is configured to converge the signal light and direct the signal light to the fingerprint sensor; and the support is configured to accommodate and fix the lens.

In a possible implementation manner, the optical component includes at least one camera lens, a lens barrel and a lens holder; the camera lens is configured to converge the signal light and direct the signal light to the fingerprint sensor; the lens barrel is configured to accommodate the camera lens; and the lens holder is configured to fix the lens barrel.

In one possible implementation manner, the lens barrel and the lens holder are of an integrated structure.

In one possible implementation manner, the lens barrel and the lens holder are of a separate structure, and the lens barrel and the lens holder are fixed through threaded connection.

In one possible implementation manner, the optical component includes a microlens array and a diaphragm array disposed under the microlens array; the microlens array includes a plurality of microlenses configured to converge the signal light; the diaphragm array includes a plurality of diaphragms, where the diaphragms are in one-to-one correspondence with the microlenses, and the diaphragms are configured to direct the signal light converged by the microlens to the fingerprint sensor.

In one possible implementation manner, the fingerprint sensor includes a driving interface electrically connected to the non-visible light source, and is configured to directly control the non-visible light source to actively emit light.

In one possible implementation manner, the optical fingerprint identification apparatus further includes a control module, and the fingerprint sensor is electrically connected to the non-visible light source through the control module; the fingerprint sensor is communicatively connected to the control module, and a driving interface of the control module is electrically connected to the non-visible light source; and the fingerprint sensor is configured to indirectly control the non-visible light source to actively emit light through the control module.

In one possible implementation manner, the optical fingerprint identification apparatus includes two operating modes of a finger approaching detection mode and a fingerprint detection mode.

In one possible implementation manner, in the finger approaching detection mode, the fingerprint sensor controls the non-visible light source to periodically and intermittently emit light, a light emitting period is a first period, a light emitting time of each period is a first light emitting time, a driving current output by the driving interface is a first driving current, and the first driving current is configured to drive the non-visible light source to actively emit light.

In one possible implementation manner, in the fingerprint detection mode, the fingerprint sensor controls the non-visible light source to periodically and intermittently emit light, a light emitting period of the non-visible light source is a second period, a light emitting time of each period is a second light emitting time, a driving current output by the driving interface is a second driving current, and the second driving current is configured to drive the non-visible light source to actively emit light; and the second period is greater than the first period, the second light emitting time is greater than the first light emitting time, and the second driving current is greater than the first driving current.

In one possible implementation manner, the fingerprint sensor includes a plurality of pixel units, and in the finger approaching detection mode, part of the pixel units perform imaging based on the signal light; and in the fingerprint detection mode, all of the pixel units perform imaging based on the signal light.

In a second aspect, provided is an electronic device including a display screen configured to display a picture and detect presence of a contact input and the optical fingerprint identification apparatus in the first aspect or any possible implementation manner of the first aspect.

In a third aspect, provided is a fingerprint identification method applied to the electronic device of the second aspect, and the fingerprint identification method includes: enabling a finger approaching detection mode, performing imaging based on signal light scattered and/or reflected from an object above a fingerprint capturing area when a non-visible light source illuminates the fingerprint capturing area, and determining whether an object is approaching; determining whether an object presses a display screen by pressing detection; if it is determined that an object is approaching, determining, according to a result of the pressing detection, whether pressing of the object is finger pressing or foreign body mistouching; if it is determined that the pressing of the object is the finger pressing, enabling a fingerprint detection mode, and performing imaging based on the signal light to obtain a fingerprint image.

In one possible implementation manner, the enabling the finger approaching detection mode includes: controlling, by a fingerprint sensor, the non-visible light source to actively emit light, where the fingerprint sensor drives the non-visible light source through a driving current, a light emitting period of the non-visible light source is a first period, a light emitting time of each period is a first light emitting time, and the driving current is a first driving current.

In one possible implementation manner, the if it is determined that the pressing of the object is the finger pressing, enabling the fingerprint detection mode includes: controlling, by the fingerprint sensor, the non-visible light source to actively emit light, the fingerprint sensor drives the non-visible light source through a driving current, a light emitting period of the non-visible light source is a second period, a light emitting time of each period is a second light emitting time, and the driving current is a second driving current; and the second period is greater than the first period, the second light emitting time is greater than the first light emitting time, and the second driving current is greater than the first driving current.

Based on the foregoing technical solution, a wavelength of excitation light used for fingerprint identification could be flexibly selected, an ability to distinguish between real and fake fingers is improved, and safety of fingerprint identification is further improved.

DESCRIPTION OF EMBODIMENTS

Technical solutions in embodiments of the present application will be described hereinafter in conjunction with the accompanying drawings.

It should be understood that technical solutions of embodiments of the present application may be applied to various electronic devices, for example, a portable or mobile computing device such as a smart phone, a notebook computer, a tablet computer and a game device, and other electronic devices such as an electronic database, an automobile and an automated teller machine (ATM), which is not limited in the embodiments of the present application.

As a common application scenario, an optical fingerprint identification apparatus provided in an embodiment of the present application may be applied to a smart phone, a tablet computer, and other electronic devices with a display screen or other electronic devices; More specifically, in the foregoing electronic device, the optical fingerprint identification apparatus may be disposed in a partial area or an entire area under a display screen, thereby forming an under-display or under-screen optical fingerprint system.

Figure 1:
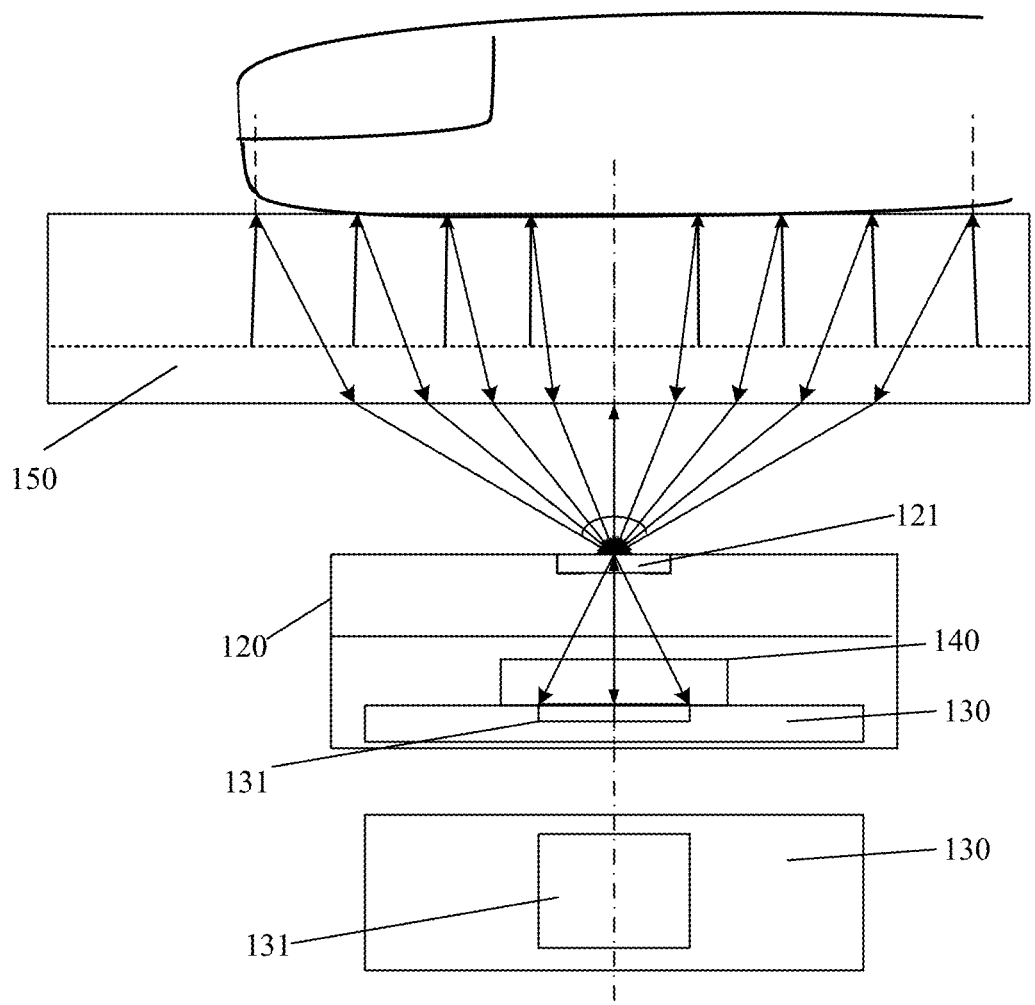
FIG. 1 is a schematic structural diagram of an under-screen fingerprint identification apparatus.

FIG. 1 is a schematic structural diagram of an under-screen fingerprint identification apparatus. As shown in FIG. 1, a display screen 150 may be an organic light-emitting diode (OLED) display screen, visible light emitted by a light emitting unit of the OLED display screen is configured to provide excitation light for fingerprint identification; when a finger is pressed against a fingerprint detecting area (not shown in FIG. 1) of the display screen 150, the excitation light is reflected by the finger and reaches an area under the display screen 150; and at this time, the reflected excitation light carries fingerprint information of the finger and becomes signal light. The signal light continues to be transmitted downward to reach an optical component 120; optionally, the optical component 120 may include a lens 121 configured to converge the signal light reflected by the finger to a photosensitive area 131 of a fingerprint sensor 130 to capture a fingerprint image. A lower part of FIG. 1 is a top view of the fingerprint sensor 130.

Optionally, a filter 140 may also be disposed between the optical component 120 and the fingerprint sensor 130, and the filter 140 is configured to filter stray light to obtain a better imaging effect.

In an existing optical fingerprint identification apparatus, the fingerprint sensor 130 may only passively receive visible light emitted by the OLED display screen, thus limiting flexible selection of a wavelength of excitation light used for imaging. The optical fingerprint identification apparatus provided in the embodiment of the present application may flexibly select the wavelength of the excitation light used for imaging, improve an ability to distinguish between real and fake fingers, and further improve safety of fingerprint identification.

Figure 2:
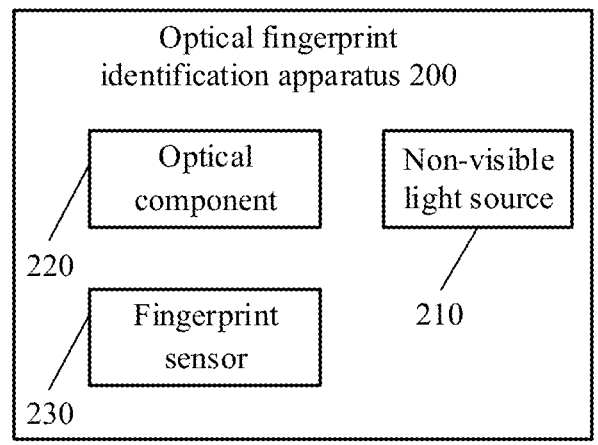
FIG. 2 is a schematic structural diagram of an optical fingerprint identification apparatus according to an embodiment of the present application.

FIG. 2 is a schematic structural diagram of an optical fingerprint identification apparatus according to an embodiment of the present application. An optical fingerprint identification apparatus 200 may be applied to an electronic device having a display screen, and includes at least one non-visible light source 210, an optical component 220, and a fingerprint sensor 230.

The non-visible light source 210 emits non-visible light to a human finger to provide excitation light for fingerprint identification, and the number of light emitting wave bands of the non-visible light source 210 is at least 1. The optical fingerprint identification apparatus 200 may include the at least one non-visible light source 210, and if the number of non-visible light sources 210 is greater than 1, the number of light emitting wave bands of the non-visible light sources 210 is greater than or equal to 1, for example, when the optical fingerprint identification apparatus 200 includes two non-visible light sources 210, wavelengths of the two non-visible light sources 210 may be 850 nm and 940 nm, respectively, or may be both 850 nm, or may be both 940 nm. The number of non-visible light sources 210 and the number of light emitting wave bands are not limited in the embodiment of the present application, and are set according to requirements of an actual product.

It should be understood that when a plurality of non-visible light sources 210 adopt a same light emitting wave band, it has advantages of having high illumination intensity, obtaining stronger signal light for fingerprint detection, and acquiring a better fingerprint imaging effect; also when the plurality of non-visible light sources 210 are located in different positions, the finger may be imaged at different angles, and the fingerprint imaging effect may also be improved; and when the plurality of non-visible light sources 210 adopt different light emitting wave bands, in addition to increasing the illumination intensity, the finger may be imaged in different wave bands to obtain different imaging features. Specifically, different objects have different transmittance for light with different wavelengths; for example, a finger has lower transmittance for light with a wavelength of 850 nm than that of light with a wavelength of 940 nm, and a fake finger and other foreign objects have relatively close transmittance for the foregoing light with the two wavelengths; therefore, when fingerprint imaging is performed, data of the real finger and data of the fake finger or other foreign objects will differ significantly; and this feature may be used to distinguish between the real finger and the fake finger and foreign object, improve an interception rate of fake finger attacks, that is, to improve the ability to distinguish between the real finger and the fake finger, and further improve security of fingerprint identification. In other words, by increasing the number of light emitting wave bands of the non-visible light source 210, difference characteristic data of transmittance of different objects for light with different wavelengths is increased, thereby improving the ability of the optical fingerprint identification apparatus to distinguish between the real finger and the fake finger and foreign object.

The optical component 220 is disposed under a fingerprint detecting area of the display screen, is configured to receive signal light scattered and reflected by the human finger, and collimate or converge the signal light. The optical component 220 has higher transmittance for the non-visible light emitted by the non-visible light source 210. As an optional embodiment, the optical component 220 may include a collimator array, and the collimator array includes a plurality of collimating holes configured to collimate the signal light and direct the signal light to the fingerprint sensor 230.

As another optional embodiment, the optical component 220 may include at least one lens and a holder. The lens is configured to converge the signal light and direct the signal light to the fingerprint sensor 230; the lens may increase an incident angle of a central field of view, increase convergence of the signal light and obtain a better imaging effect. It should be understood that the number of lenses may be multiple, so that a better convergence effect may be obtained, and at the same time, the lens may be a spherical lens or an aspheric lens, or a combination of a spherical lens and an aspheric lens, which is not limited in this embodiment. The support is configured to accommodate and fix the lens.

As another optional embodiment, the optical component 220 may include at least one camera lens, a lens barrel and a lens holder; the camera lens is configured to converge the signal light and direct the signal light to the fingerprint sensor 230; the lens barrel is configured to accommodate the camera lens; and the lens holder is configured to fix the lens barrel. Optionally, the lens barrel and the lens holder may be of an integrated structure, or the lens barrel and the lens holder may be of a separate structure, and the lens barrel and the lens holder are fixed through threaded connection.

As another optional embodiment, the optical component 220 may include a microlens array and a diaphragm array disposed under the microlens array; the microlens array includes a plurality of microlenses configured to converge the signal light; the diaphragm array includes a plurality of diaphragms, where the diaphragms are in one-to-one correspondence with the microlenses, and the diaphragms are configured to direct the signal light converged by the microlens to the fingerprint sensor 230.

The fingerprint sensor 230 is disposed under the optical component 220, and is configured to perform imaging based on the signal light passing through the optical component 220, where a working wave band of the fingerprint sensor 230 is the same as the light emitting wave band of the non-visible light source 210, the number of working wave bands is the same as the number of light emitting wave bands, and the fingerprint sensor 230 is directly or indirectly electrically connected to the non-visible light source 210, and is configured to control the non-visible light source 210 to actively emit light.

It should be understood that when the optical fingerprint identification apparatus 200 includes more than one non-visible light source 210 and the number of light emitting wave bands of the non-visible light source 210 is greater than 1, the number of working wave bands of the fingerprint sensor 230 is the same as the number of light emitting wave bands, and is also greater than 1, that is, there may be multiple working wave bands of the fingerprint sensor 230. For example, when the optical fingerprint identification apparatus 200 includes two non-visible light sources 210, wavelengths of the two non-visible light sources 210 may be 850 nm and 940 nm, respectively, the number of working wave bands of the fingerprint sensor 230 is the same as the number of light emitting wave bands of the non-visible light sources 210, and there are also two wave bands, which are 850 nm and 940 nm, respectively, the fingerprint sensor 230 is not sensitive to light of other wave bands except 850 nm and 940 nm, and thus an influence of light of other wave bands on a fingerprint imaging effect may be reduced.

Figure 5:
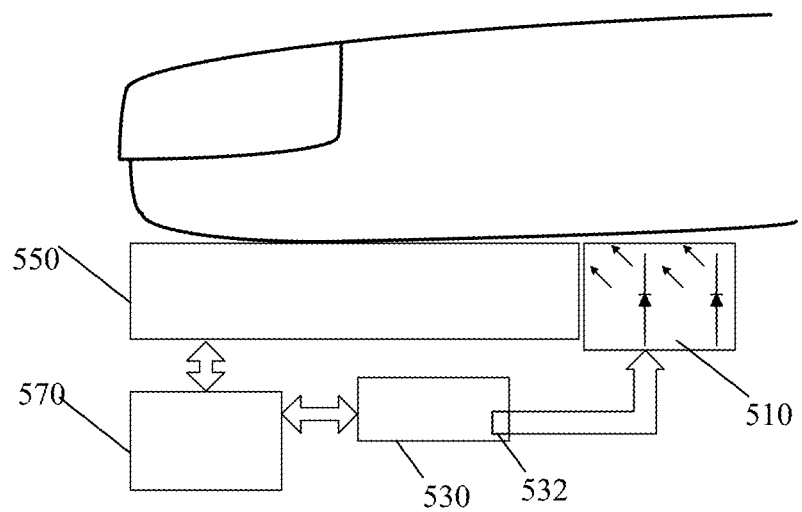
FIG. 5 is a schematic diagram of an internal connection relationship of an optical fingerprint identification apparatus according to an embodiment of the present application.
Figure 6:
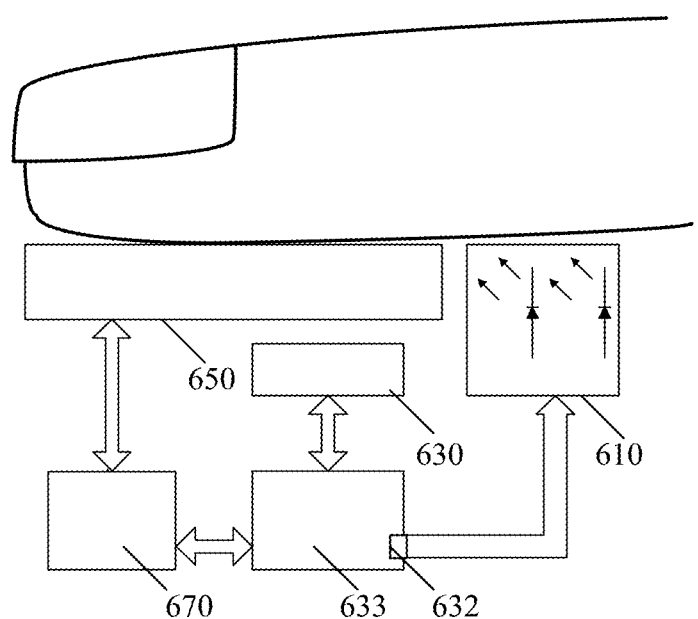
FIG. 6 is a schematic diagram of an internal connection relationship of another optical fingerprint identification apparatus according to an embodiment of the present application.

The fingerprint sensor 230 is directly or indirectly electrically connected to the non-visible light source 210 (not shown in FIG. 2), and is configured to control the non-visible light source 210 to actively emit light, which may be referred to FIGS. 5 and 6, and this embodiment will not be described in detail.

Figure 3:
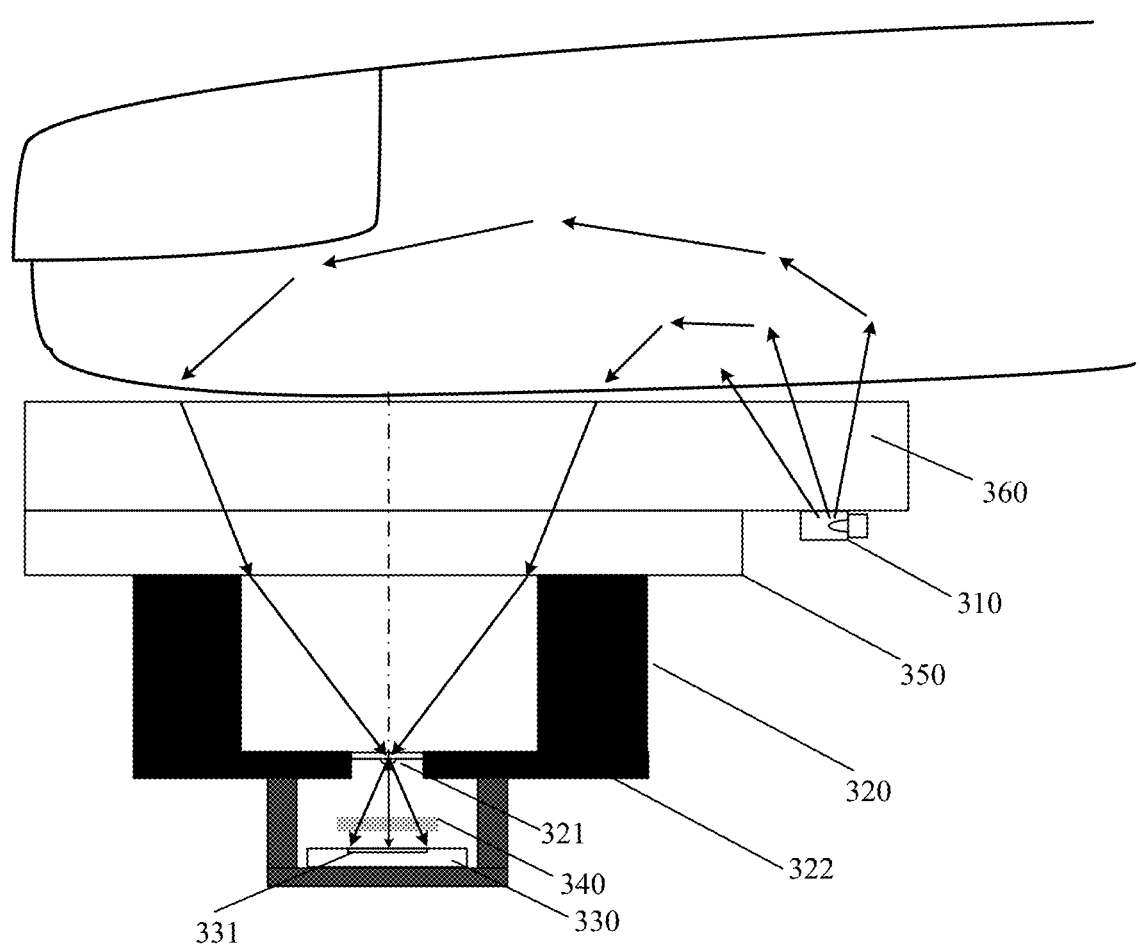
FIG. 3 is a schematic diagram of an optical fingerprint identification apparatus performing fingerprint identification according to the embodiment of the present application.

FIG. 3 is a schematic diagram of an optical fingerprint identification apparatus performing fingerprint identification according to an embodiment of the present application, that is, it is a schematic diagram of the optical fingerprint identification apparatus 200 shown in FIG. 2 applied to an electronic device performing fingerprint identification. As shown in FIG. 3, a fingerprint identification apparatus includes a non-visible light source 310, an optical component 320, and a fingerprint sensor 330, which have been described in detail in FIG. 2 and will not be repeatedly described herein.

An electronic device may include a cover glass 360 for protecting a display screen 350, and the display screen 350 and the non-visible light source 310 may be disposed side by side under the cover glass 360. It should be understood that in order to prevent a user from seeing the non-visible light source 310 disposed under the cover glass through the cover glass 360, a layer of an isolation film (not shown in FIG. 3) may be disposed between the cover glass 360 and the non-visible light source 310, the isolation film may block visible light and has higher transmittance for the non-visible light emitted by the non-visible light source 310.

The optical component 320 may be disposed under the display screen 350, specifically, may be located under a fingerprint detecting area (not shown in FIG. 3) of the display screen 350, and the fingerprint detecting area is located in part or all of a display area of the display screen. The fingerprint sensor 330 may be disposed under the optical component 320. The optical component 320 shown in this embodiment includes a lens 321 and a support 322. The lens 321 is configured to converge the signal light and direct the signal light to the fingerprint sensor 330; and the lens 321 may increase an incident angle of a central field of view, increase convergence of the signal light, and obtain a better imaging effect. It should be understood that the number of lenses 321 may be multiple, so that a better convergence effect may be obtained, and at the same time, the lens 321 may be a spherical lens or an aspheric lens, or a combination of a spherical lens and an aspheric lens, which is not limited in this embodiment. The support 322 is configured to accommodate and fix the lens 321. The optical component 320 in the optical fingerprint identification apparatus shown in FIG. 3 is merely illustrative, and the optical component 320 may also be an optical component including a collimator array, or an optical component including at least one camera lens, a lens barrel and a lens holder. Reference is made to the contents described in FIG. 2, which will not be repeatedly described herein.

A basic process of performing fingerprint identification by the optical fingerprint identification apparatus in this embodiment is as follows: the non-visible light emitted by the non-visible light source 310 is incident on the interior of a human finger pressed on the cover glass 360 through the cover glass 360, is scattered by tissues in the finger or is reflected by a finger surface, and then sequentially passes through the cover glass 360, the display screen 350 and the optical component 320, to reach the fingerprint sensor 330; and the scattered and/or reflected non-visible light carries fingerprint information of the finger to become the signal light, and the fingerprint sensor 330 is configured to perform imaging based on the signal light. The fingerprint sensor 330 may include a photosensitive area 331 which may include a plurality of pixel units. Therefore, the fingerprint sensor 330 is configured to perform imaging based on the signal light, which actually refers that the photosensitive area 331 of the fingerprint sensor 330 is configured to perform imaging based on the signal light.

The optical fingerprint identification apparatus may also include a filter 340 which may be disposed in a light path between the display screen 350 and the fingerprint sensor 330. As an optional embodiment, the filter 340 is disposed between the optical component 320 and the fingerprint sensor 330, and a light passing wave band of the filter 340 is the same as a light emitting wave band of the non-visible light source 310, and therefore the filter 340 can filter stray light and reduce interference of stray light in fingerprint identification. For example, a film may be coated on a surface of the fingerprint sensor 330 by a vapor deposition process to form the filter 340, and other components may be used to fix the filter 340 between the optical component 320 and the fingerprint sensor 330, which is not limited in this embodiment and may be set according to an actual product requirement.

When the number of non-visible light sources 310 is greater than 1, the number of light emitting wave bands of the non-visible light sources 310 is greater than or equal to 1, the number of light passing wave bands of the filter 340 is equal to the number of light emitting wave bands of the non-visible light source 310, and the light emitting wave bands is in one-to-one correspondence with the light passing wave band. It should be understood that when the fingerprint identification apparatus includes more than one non-visible light source 310 and the number of light emitting wave bands of the non-visible light source 310 is greater than 1, the number of light passing wave bands of the filter 340 is the same as the number of light emitting wave bands, and is also greater than 1, that is, there may be multiple light passing wave bands of the filter 340. For example, when the fingerprint identification apparatus includes two non-visible light sources 310, wavelengths of the two non-visible light sources 310 may be 850 nm and 940 nm, respectively, the number of light passing wave bands of the filter 340 is the same as the number of light emitting wave bands of the non-visible light sources 310, and there are two wave bands, which are 850 nm and 940 nm, respectively.

In the embodiment of the present application, the display screen 350 may be an OLED display screen. Here, non-visible light emitted by the non-visible light source 310 in the optical fingerprint identification apparatus rather than visible light emitted by the OLED display screen is used as excitation light for fingerprint identification, which has advantages of flexibly selecting a wavelength of the excitation light for fingerprint identification, improving the ability to distinguish between real and fake fingers, and further improving safety of fingerprint identification. As another optional embodiment, the optical fingerprint identification apparatus may also be applied to an electronic device having other types of display screen, for example, the display screen may include a display module and a backlight module, the backlight module is configured to provide a visible light source to make a display module display a picture, as shown in FIG. 4.

Figure 4:
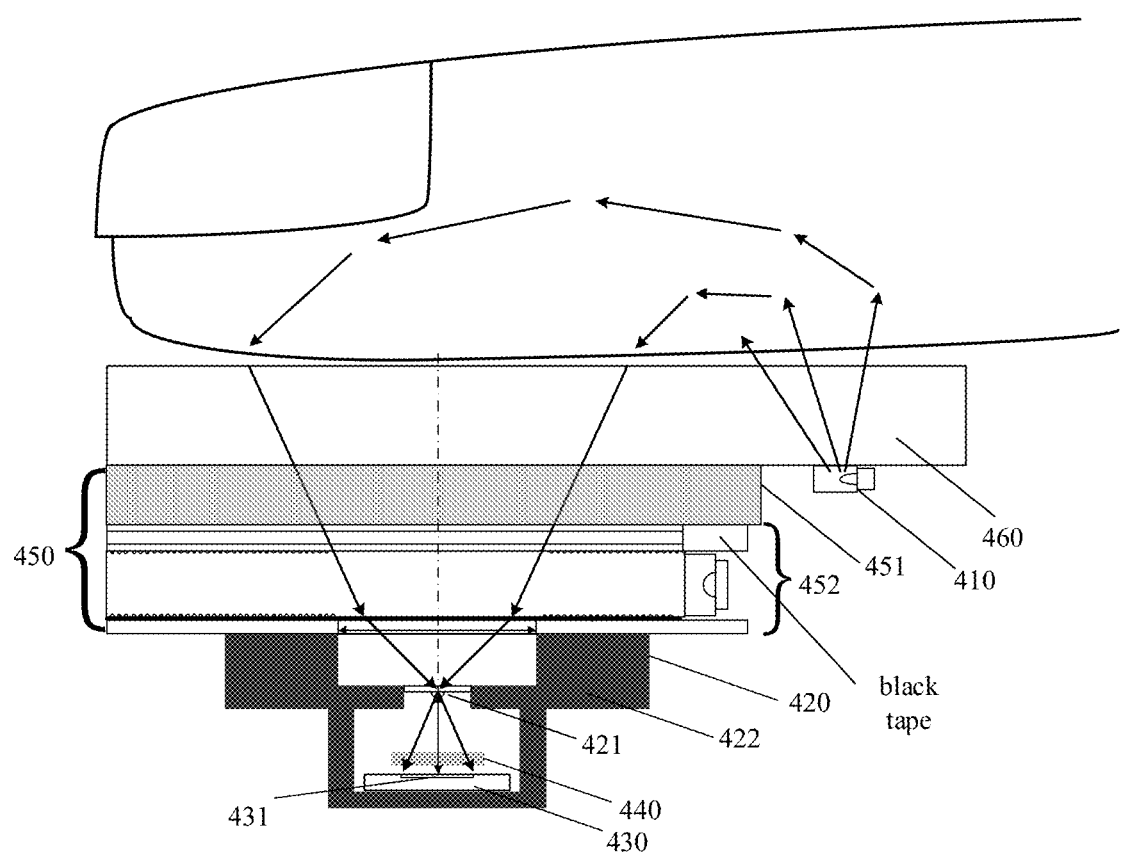
FIG. 4 is a schematic diagram of another optical fingerprint identification apparatus performing fingerprint identification according to an embodiment of the present application.

As shown in FIG. 4, a display screen 450 includes a display module 451 and a backlight module 452. Optionally, the display module 451 may be a liquid crystal module and the display screen 450 may be a liquid crystal display screen. An existing backlight module generally includes a point light source and a plurality of layers of laminated materials with different functions, and the laminated material includes a reflective film (also referred to as a mirror film), a light directing plate, a light homogenizing film (also referred to as a diffusion film) and a prism film (also referred to as a brightness enhancement film), and there are at least one layer of the light homogenizing film and at least one layer of the prism film. A purpose of combining these laminated materials is to make one or more point light sources form a surface light source, and also to improve a light extraction rate, so that a picture displayed on the liquid crystal display screen could appear uniform in brightness. As the reflective film reflects light, other remaining laminated materials such as the light directing plate, the light homogenizing film and the prism film would disperse the light, especially the light homogenizing film would play a nebulizing role, and the whole backlight module is considered to be opaque. Therefore, it is necessary to modify the backlight module so that it can transmit the non-visible light emitted by a non-visible light source 410, thereby implementing fingerprint identification. The backlight module 452 is a modified module of the existing backlight module, which has higher transmittance for the non-visible light emitted by the non-visible light source 410, and thus under-screen optical fingerprint detection may be performed.

As shown in FIG. 4, the display screen 450 and the non-visible light source 410 are disposed side by side under a cover glass 460, and an optical component 420 is disposed under the fingerprint detecting area (not shown in FIG. 4) of the display screen 450. The optical component 420 includes a lens 421 and a support 422. A fingerprint sensor 430 is disposed under the optical component 420, and a photosensitive area 431 of the fingerprint sensor 430 is configured to image received signal light. The optical fingerprint identification apparatus may further include a filter 440, and as an optional embodiment, the filter 440 may be disposed between the optical component 420 and the fingerprint sensor 430. Other features besides the display screen in FIG. 4 may also be referred to the content of FIG. 3, which will not be repeatedly described herein. It should be understood that the optical fingerprint identification apparatus shown in FIGS. 3 and 4 is merely illustrative and should not be construed as a limitation on the optical fingerprint identification apparatus of the present application.

FIGS. 5 and 6 are schematic diagrams of internal connection relationships of two optical fingerprint identification apparatuses according to embodiments of the present application. It should be understood that FIGS. 5 and 6 are applicable to the optical fingerprint identification apparatus shown in FIGS. 2 to 4, and for the sake of brevity, the same contents as those in FIGS. 2 to 4 will not be repeatedly described herein.

As shown in FIG. 5, a fingerprint sensor 530 is directly connected to a non-visible light source 510. Optionally, the fingerprint sensor 530 includes a driving interface 532, through which the fingerprint sensor 530 outputs a driving signal, and the driving signal may be a driving current or a driving voltage, the fingerprint sensor 530 is configured to directly control the non-visible light source 510 to actively emit light, that is, the fingerprint sensor 530 controls the non-visible light source 510 to emit light through the output driving signal.

A display screen 550 of an electronic device may display a picture, and optionally, the display screen 550 may also detect presence of a touch input, for example, a touch or pressing operation of a user's finger can be detected, so as to provide a human-computer interaction interface for the user, that is, the display screen 550 may be a touch display screen with a touch function. For example, in an embodiment, the electronic device may include a touch sensor, and the touch sensor may be specifically a touch panel (TP), which may be disposed on a surface of the display screen 550, or may be partially integrated or entirely integrated into an interior of the display screen 550 to form the touch display screen.

As an optional embodiment, both the fingerprint sensor 530 and the display screen 550 may be communicatively connected to a main control unit 570 of the electronic device, and both may respond to a command of the main control unit 570 and transmit data.

As shown in FIG. 6, an optical fingerprint identification apparatus further includes a control module 633, through which a fingerprint sensor 630 is electrically connected to a non-visible light source 610. The fingerprint sensor 630 is communicatively connected to the control module 633 to transmit data.

Optionally, the control module 633 includes a driving interface 632, through which the control module 633 outputs a driving signal, and the driving signal may be a driving current or a driving voltage; the fingerprint sensor 630 is configured to indirectly control the non-visible light source 610 to actively emit light through the control module 633, that is, the fingerprint sensor 630 indirectly controls the non-visible light source 610 to emit light through the driving signal output by the control module 633.

A display screen 650 in FIG. 6 is similar to the display screen 550, and may be a touch display screen, which will not be repeatedly described herein. As an optional embodiment, both the control unit 633 and the display screen 650 may be communicatively connected to a main control unit 670 of an electronic device, and both may respond to a command of the main control unit 670 and transmit data.

Figure 7:
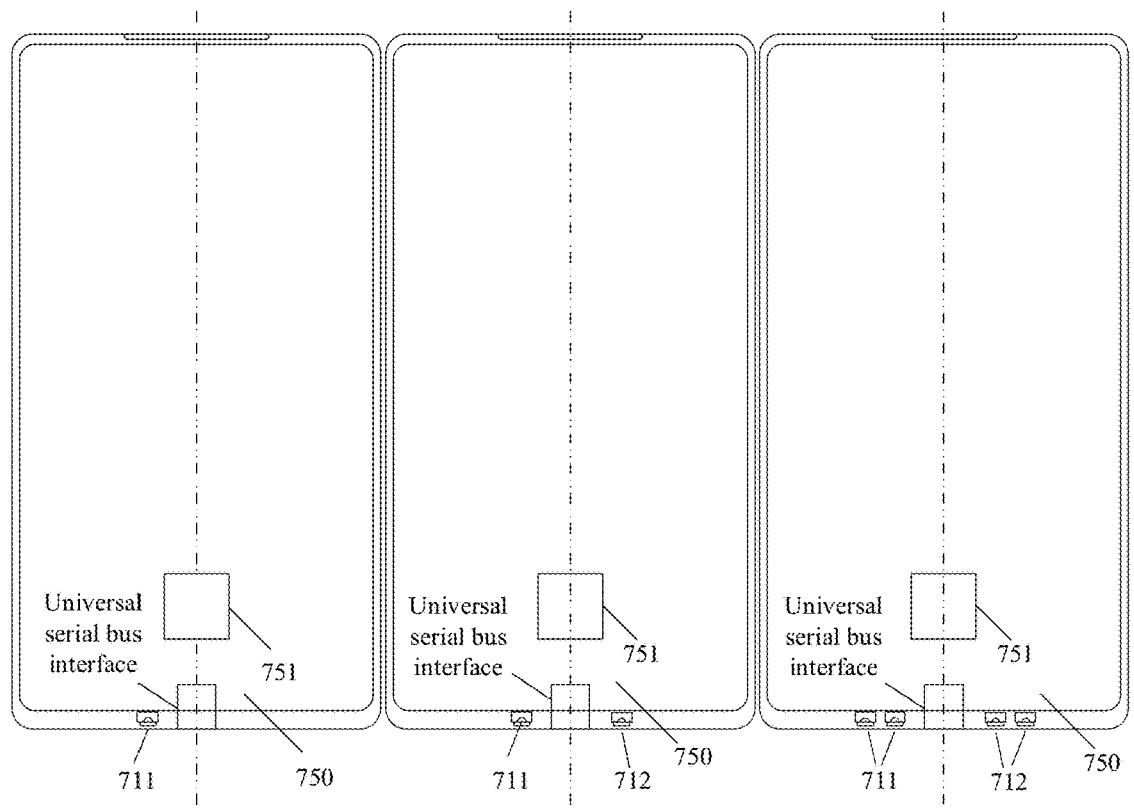
FIG. 7 is a schematic diagram of an optical fingerprint identification apparatus applied to an electronic device according to an embodiment of the present application.

FIG. 7 is a schematic diagram of an optical fingerprint identification apparatus applied to an electronic device according to an embodiment of the present application. FIG. 7 does not show an entire structure of an optical fingerprint identification apparatus, and the entire structure thereof may be understood with reference to FIG. 3. As shown in FIG. 3, the optical component 320, the fingerprint sensor 330, and the filter 340 may all be disposed under the fingerprint detecting area of the display screen 350 of the electronic device, that is, under a fingerprint detecting area 751 of a display screen 750 in FIG. 7. Considering that a universal serial bus (USB) interface is generally disposed at a central position of a lower area of an electronic device, the USB interface may be connected to a charger to charge the electronic device or the USB interface may be used as an earphone jack to connect headphones.

Optionally, the non-visible light source may be disposed on at least one side of the USB interface of the electronic device. FIG. 7 shows three embodiments in sequence, and from left to right, a first embodiment is that a non-visible light source 711 is disposed on a left side of the USB interface; a second embodiment is that a non-visible light source 711 and a non-visible light source 712 are respectively disposed on a left side and a right side of the USB interface, and light emitting wave bands of the non-visible light source 711 and the non-visible light source 712 may be the same or different, which is not limited in this embodiment; different from the second embodiment, in a third embodiment the number of non-visible light sources 711 and non-visible light sources 712 may be greater than 1, respectively, and in this embodiment, two non-visible light sources 711 are disposed on a left side of the USB interface and two non-visible light sources 712 are disposed on a right side of the USB interface. The embodiment shown in FIG. 7 is merely exemplary and should not be taken as a limitation on the present application. Optionally, the display screen 750 and the non-visible light source may be disposed side by side under the cover glass.

Figure 8:
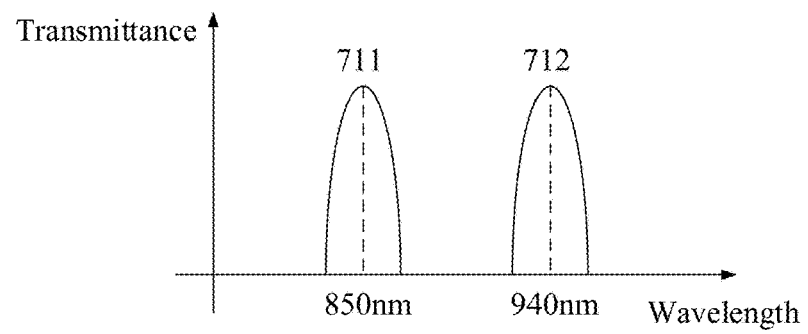
FIGS. 8 to 10 are transmittance of a filter of an optical fingerprint identification apparatus for non-visible light sources with different wavelengths according to an embodiment of the present application.
Figure 9:
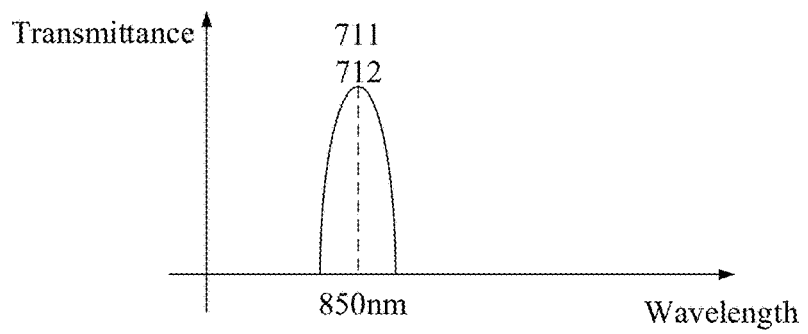
Figure 10:
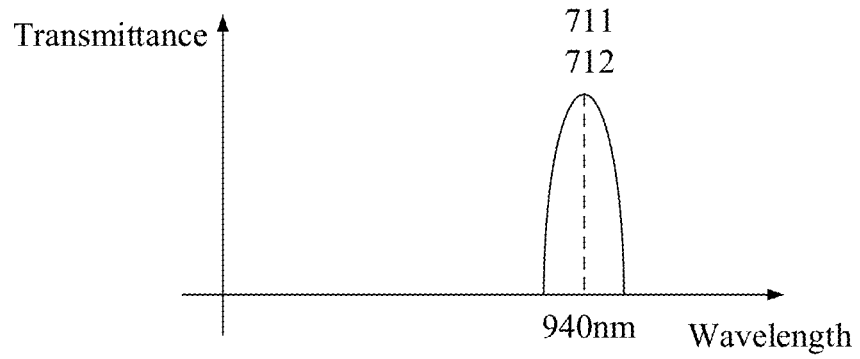

FIGS. 8 to 10 are schematic diagrams of transmittance of a filter of an optical fingerprint identification apparatus to non-visible light sources with different wavelengths according to an embodiment of the present application. The number of light passing wave bands of a filter may be greater than 1, and be equal to the number of light emitting wave bands of a non-visible light source. As shown in FIG. 8, the filter may pass through non-visible light of two wave bands at the same time, and the number of light passing wave bands is 2, that is, the filter has higher transmittance for non-visible light of the two wave bands; and reference is made to the second embodiment or the third embodiment of FIG. 7, for example, the light emitting wave band of the non-visible light source 711 may be 850 nm, and the light emitting wave band of the non-visible light source 712 may be 940 nm. The light passing wave bands of the filter are 850 nm and 940 nm, and therefore the filter has higher transmittance for the non-visible light source 711 and the non-visible light source 712.

As shown in FIG. 9 and FIG. 10, the filter may only pass through non-visible light of one wave band, and the number of light passing wave bands is 1, that is, the filter only has higher transmittance for non-visible light of one wave band, and reference may also be made to the second embodiment or the third embodiment of FIG. 7, for example, the light emitting wave bands of the non-visible light source 711 and the non-visible light source 712 may both be 850 nm, and the light passing wave band of the filter is 850 nm. Alternatively, the light emitting wave bands of the non-visible light source 711 and the non-visible light source 712 may both be 940 nm, and correspondingly the light passing wave band of the filter is 940 nm. The embodiment of the present application does not limit the number and wave band of light passing wave bands of the filter, as long as it corresponds to the number and wave band of light emitting wave bands of the non-visible light source. The filter is configured to filter stray light to improve the imaging effect of fingerprint identification.

Figure 11:
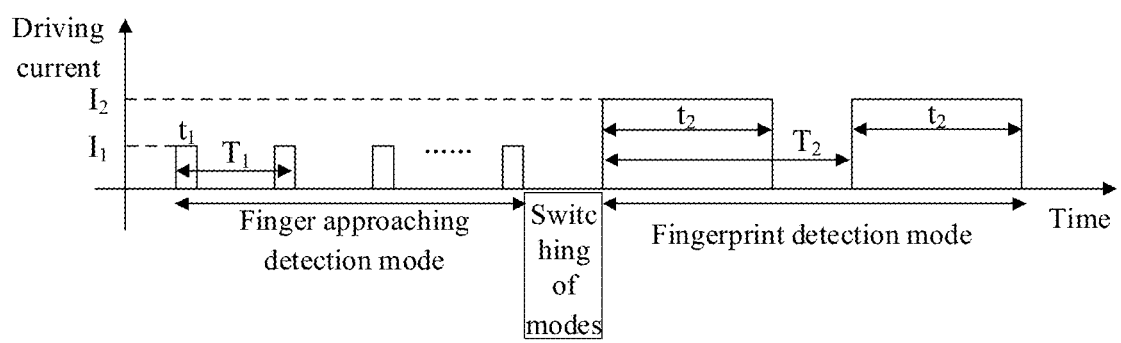
FIG. 11 is a schematic diagram of working states of an optical fingerprint identification apparatus in a finger approaching detection mode and a fingerprint detection mode according to an embodiment of the present application.

FIG. 11 is a schematic diagram of working states of an optical fingerprint identification apparatus in a finger approaching detection mode and a fingerprint detection mode according to an embodiment of the present application. An optical fingerprint identification apparatus of an embodiment of the present application includes two working modes of a finger approaching detection mode and a fingerprint detection mode, and the optical fingerprint identification apparatus may implement switching of the two modes. A fingerprint sensor is directly or indirectly electrically connected to a non-visible light source and is configured to control the non-visible light source to actively emit light.

In the finger approaching detection mode, instead of requiring a clear fingerprint image, whether the finger is approaching is required to be determined. Therefore, the fingerprint sensor may control the non-visible light source to periodically and intermittently emit light to detect whether a finger is approaching.

Optionally, the fingerprint sensor may directly output a driving signal to drive the non-visible light source to emit light, for example, as shown in FIG. 5, the fingerprint sensor 530 outputs the driving signal through the driving interface 532 to drive the non-visible light source 510 to actively emit light.

Optionally, the fingerprint sensor may indirectly output the driving signal to drive the non-visible light source to actively emit light through other components such as a control module, for example, as shown in FIG. 6, the control module 633 outputs the driving signal through the driving interface 632 to drive the non-visible light source 610 to actively emit light, that is, the fingerprint sensor 630 indirectly controls the non-visible light source 610 to actively emit light through the control module 633.

As an optional embodiment, the driving signal may be a driving current; in the finger approaching detection mode, a light emitting period of the non-visible light source is a first period T1, a light emitting time of each period is a first light emitting time t1, and a driving current is a first driving current I1. Moreover, in the finger approaching detection mode, as shown in a left diagram in FIG. 12, only part of pixel units of the fingerprint sensor may be turned on for detection, and part of the pixel units perform imaging based on the signal light. Similarly, since in a finger approaching detection mode, instead of requiring a clear fingerprint image, whether the finger is approaching is required to be determined, and only part of pixel units are turned on for detection, accuracy of the finger approaching detection is not be affected, and power consumption of the fingerprint sensor may be reduced.

Different from the finger approaching detection mode, in a fingerprint detection mode, when the fingerprint sensor controls the non-visible light source to periodically and intermittently emit light, a light emitting period of the non-visible light source is a second period T2, a light emitting time of each period is a second light emitting time t2, and a driving current is a second driving current I2, and T2>T1, t2>t1, I2>I1. In the finger approaching detection mode, the non-visible light source has a smaller driving current and a shorter light emitting time, and therefore power consumption thereof may also be controlled at a relatively low level. In the fingerprint detection mode, as shown in a right diagram in FIG. 12, all pixel units of the fingerprint sensor may be turned on, and all of the pixel units perform imaging based on the signal light, to ensure the accuracy of fingerprint detection.

Figure 12:
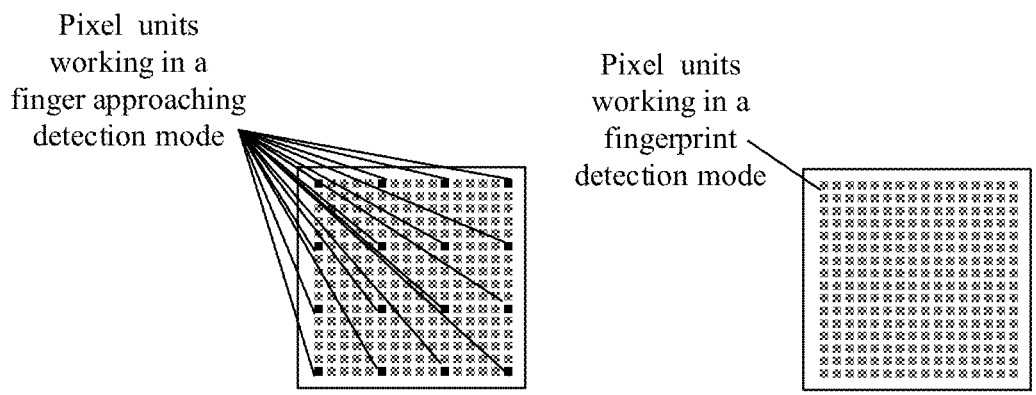
FIG. 12 is a schematic diagram of working of pixel units of a fingerprint sensor of an optical fingerprint identification apparatus in a finger approaching detection mode and a fingerprint detection mode according to an embodiment of the present application.

It should be understood that the plurality of pixel units of the fingerprint sensor shown in FIG. 12 are the photosensitive area of the fingerprint sensor.

Through the finger approaching detection mode, with the pressing detection of a display screen having a touch function, whether the finger performs pressing may be determined more accurately and the fingerprint detection mode is enabled, so that not only can mistouching events be reduced, but also camouflage of some non-transparent fake fingerprints may be intercepted, thereby implementing living body fingerprint identification.

An embodiment of the present application also provides an electronic device including a display screen and an optical fingerprint identification apparatus of the embodiment of the present application, and the display screen is configured to display a picture and detect presence of a contact input. By way of example and not limitation, the electronic device may be a terminal device, a mobile phone, a tablet computer, a notebook computer, a desktop computer, a vehicle-mounted electronic device, and a wearable smart device, or the like. The wearable smart device includes a full functioned and large sized device that may implement complete or partial functions without relying on a smart phone such as a smart watch, a smart glass or the like, and a device that is only focused on certain application functions and needs to be used in conjunction with a smart phone or other devices such as various smart bracelets and smart jewelry for physical sign monitoring.

Figure 13:
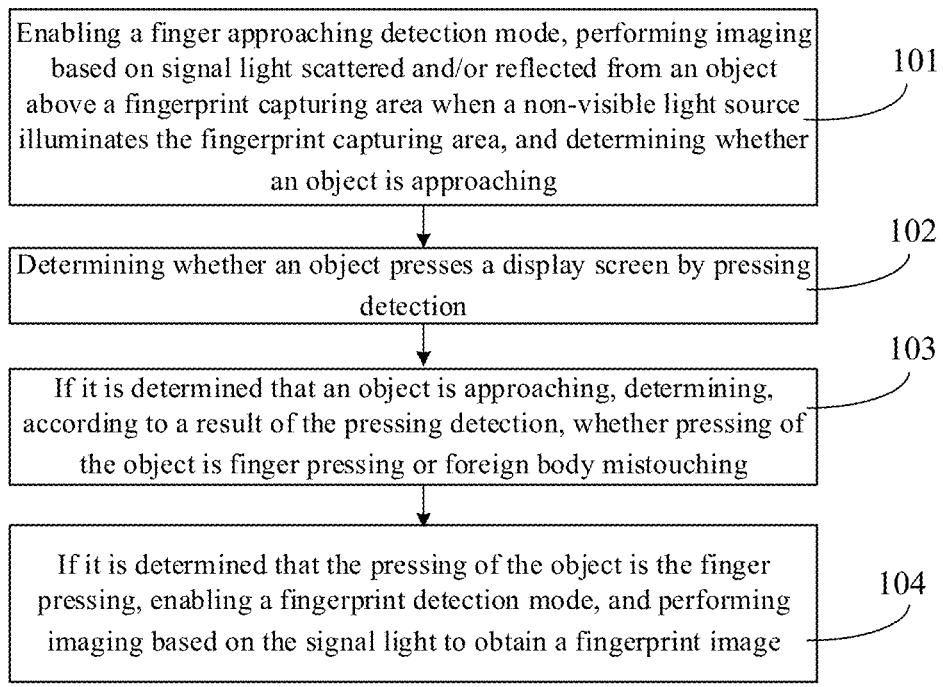
FIG. 13 is a schematic flowchart of a fingerprint identification method according to an embodiment of the present application.

FIG. 13 is a schematic flowchart of a fingerprint identification method according to an embodiment of the present application, which may be applied to an electronic device of an embodiment of the present application.

As shown in FIG. 13, the fingerprint identification method includes the following steps.

S101, enabling a finger approaching detection mode, performing imaging based on signal light scattered and/or reflected from an object above a fingerprint capturing area when a non-visible light source illuminates the fingerprint capturing area, and determining whether an object is approaching;

S102, determining whether an object presses a display screen by pressing detection;

S103, if it is determined that an object is approaching, determining, according to a result of the pressing detection, whether pressing of the object is finger pressing or foreign body mistouching; and S104, if it is determined that the pressing of the object is the finger pressing, enabling a fingerprint detection mode, and performing imaging based on the signal light to obtain a fingerprint image.

In S101, the enabling the finger approaching detection mode includes: controlling, by a fingerprint sensor, the non-visible light source to actively emit light, where the fingerprint sensor drives the non-visible light source through a driving current, a light emitting period of the non-visible light source is a first period, a light emitting time of each period is a first light emitting time, and the driving current is a first driving current.

In the finger approaching detection mode, the fingerprint sensor may control the non-visible light source to actively emit light, and in the finger approaching detection mode, instead of requiring a clear fingerprint image, whether a finger is approaching is required to be determined. Therefore, the fingerprint sensor may control the non-visible light source to periodically and intermittently emit light to detect whether a finger is approaching. Optionally, the fingerprint sensor may drive the non-visible light source directly or indirectly through a driving signal, and the driving signal may be a driving voltage or a driving current. Reference is specifically made to FIG. 11. For example, a light emitting period of the non-visible light source is a first period T1, a light emitting time of each period is a first light emitting time t1, and the driving current is a first driving current I1.

In S104, the if it is determined that the pressing of the object is the finger pressing, enabling the fingerprint detection mode includes: controlling, by the fingerprint sensor, the non-visible light source to actively emit light, where the fingerprint sensor drives the non-visible light source through a driving current, a light emitting period of the non-visible light source is a second period, a light emitting time of each period is a second light emitting time, and the driving current is a second driving current; and the second period is greater than the first period, the second light emitting time is greater than the first light emitting time, and the second driving current is greater than the first driving current.

In the fingerprint detection mode, the fingerprint sensor may control the non-visible light source to actively emit light, a light emitting period of the non-visible light source is a second period T2, a light emitting time of each period is a second light emitting time t2, and a driving current is a second driving current I2, and T2>T1, t2>t1, I2>I1. Therefore, in the finger approaching detection mode, accuracy of finger approaching detection may be achieved, and power consumption may also be controlled at a lower level.

Figure 14:
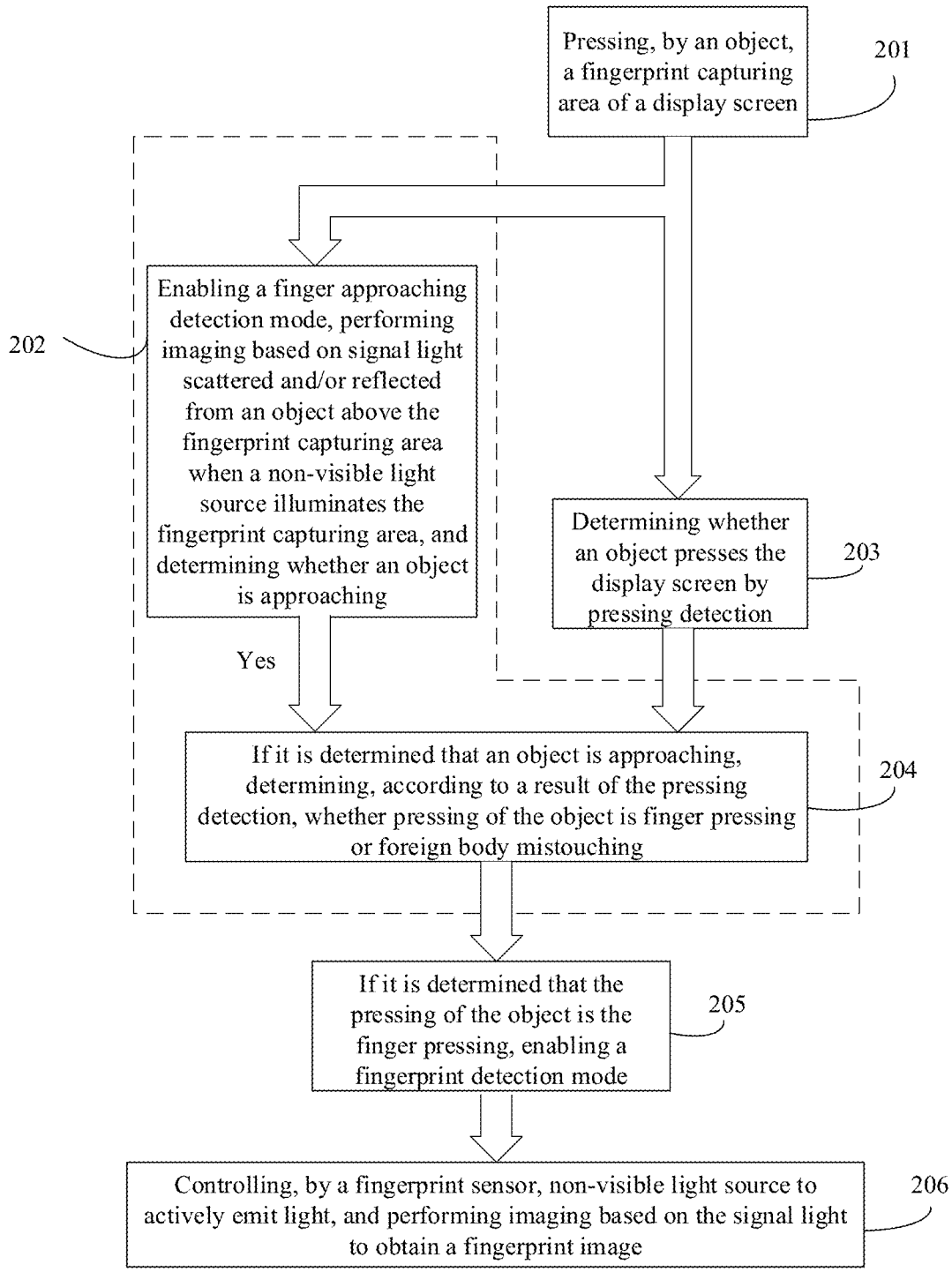
FIG. 14 is an exemplary flowchart of a fingerprint identification method according to an embodiment of the present application.
Figure 15:
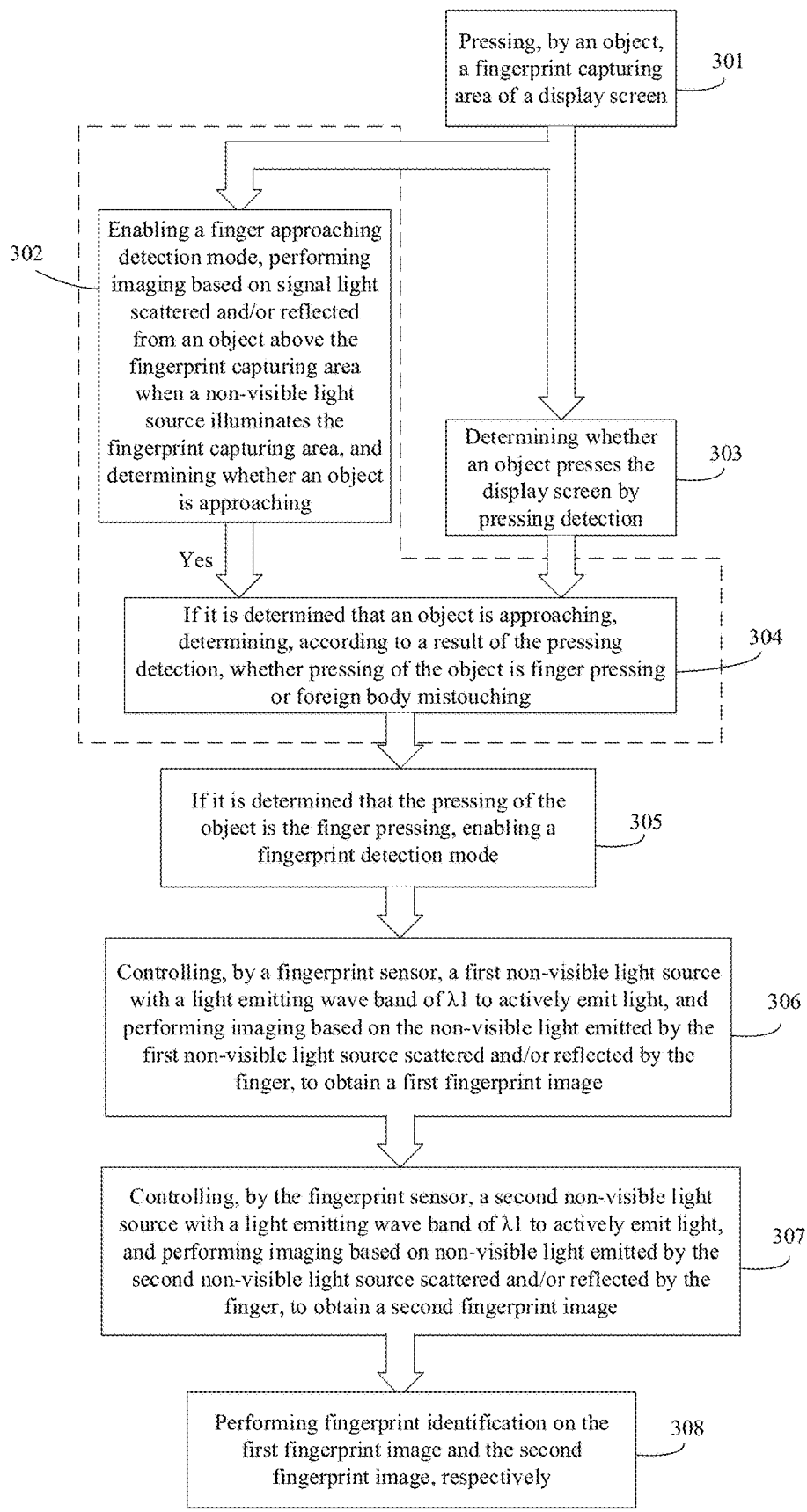
FIG. 15 is an exemplary flowchart of another fingerprint identification method according to an embodiment of the present application.
Figure 16:
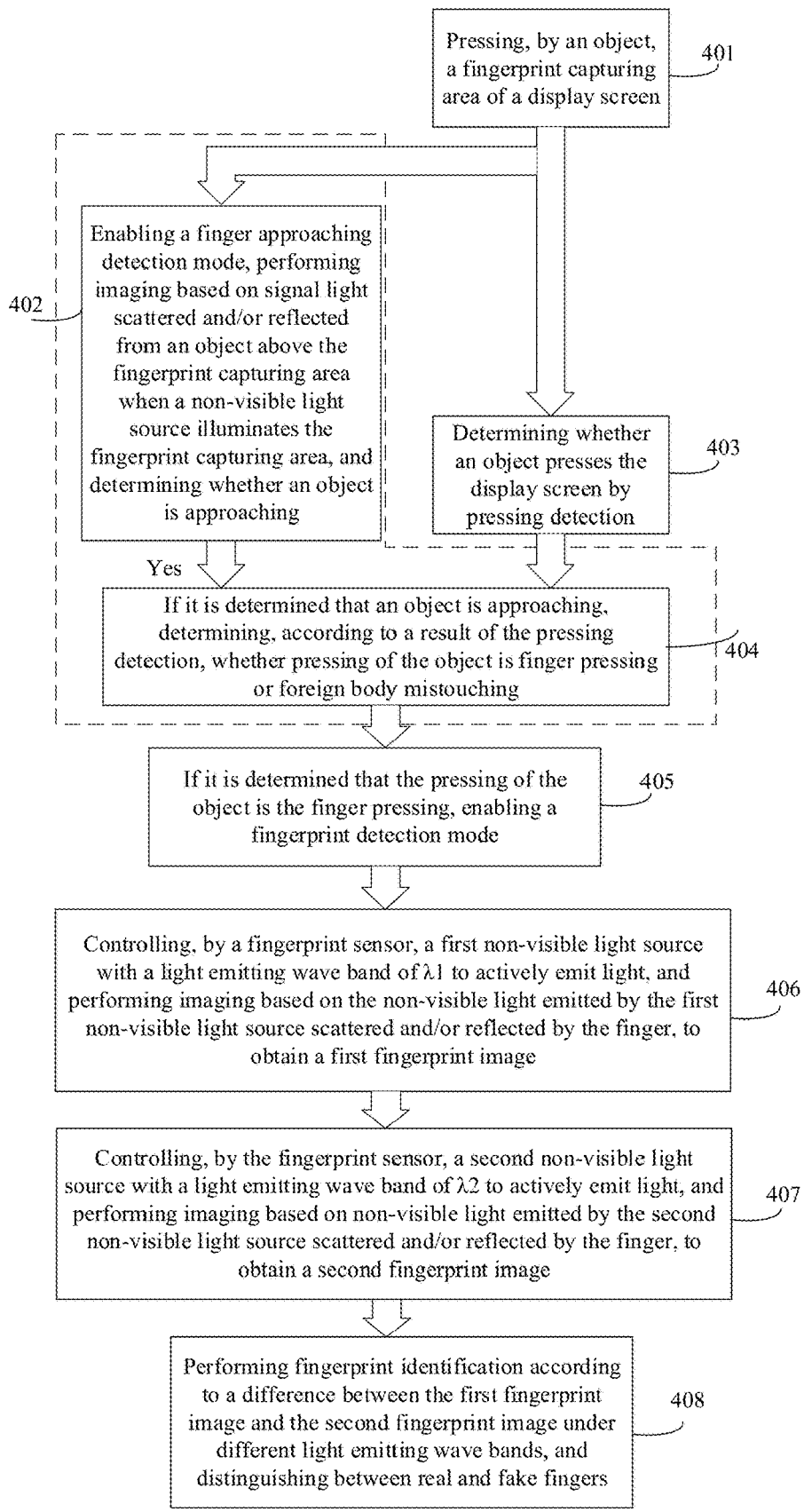
FIG. 16 is an exemplary flowchart of yet another fingerprint identification method according to an embodiment of the present application.

FIGS. 14 to 16 show schematic flowcharts of fingerprint identification methods according to three embodiments of the present application. It should be understood that, compared with FIG. 13, FIGS. 14 to 16 expand three different application scenarios, and the same content will not be repeatedly described herein.

FIG. 14 is a flowchart of a fingerprint identification method using a single light source. The fingerprint identification method includes the following steps:

S201, pressing, by an object, a fingerprint capturing area of a display screen;

S202, enabling a finger approaching detection mode, performing imaging based on signal light scattered and/or reflected from an object above the fingerprint capturing area when a non-visible light source illuminates the fingerprint capturing area, and determining whether an object is approaching;

S203, determining whether an object presses the display screen by pressing detection;

S204, if it is determined that an object is approaching, determining, according to a result of the pressing detection, whether pressing of the object is finger pressing or foreign body mistouching;

S205, if it is determined that the pressing of the object is the finger pressing, enabling a fingerprint detection mode; and S206, controlling, by a fingerprint sensor, non-visible light source to actively emit light, and performing imaging based on the signal light to obtain a fingerprint image.

In S206, the obtained fingerprint image may be matched with a previously stored authenticated fingerprint image, and if the matching succeeds, a further operation may be performed, which may be unlocking or other operations, which is not limited in this embodiment.

In FIG. 15, two non-visible light sources are taken as an example, and in actual application, more than two non-visible light sources may be selected for fingerprint identification according to an actual application scenario. FIG. 15 shows a flowchart of a fingerprint identification method using dual light sources and a single light emitting wave band. The fingerprint identification method includes the following steps:

S301, pressing, by an object, a fingerprint capturing area of a display screen;

S302, enabling a finger approaching detection mode, performing imaging based on signal light scattered and/or reflected from an object above the fingerprint capturing area when a non-visible light source illuminates the fingerprint capturing area, and determining whether an object is approaching;

S303, determining whether an object presses the display screen by pressing detection;

S304, if it is determined that an object is approaching, determining, according to a result of the pressing detection, whether pressing of the object is finger pressing or foreign body mistouching;

S305, if it is determined that the pressing of the object is the finger pressing, enabling a fingerprint detection mode; and S306, controlling, by a fingerprint sensor, a first non-visible light source with a light emitting wave band of λ1 to actively emit light, and performing imaging based on the non-visible light emitted by the first non-visible light source scattered and/or reflected by the finger, to obtain a first fingerprint image;

S307, controlling, by the fingerprint sensor, a second non-visible light source with a light emitting wave band of λ1 to actively emit light, and performing imaging based on non-visible light emitted by the second non-visible light source scattered and/or reflected by the finger, to obtain a second fingerprint image; and S308, performing fingerprint identification on the first fingerprint image and the second fingerprint image, respectively.

The first non-visible light source and the second non-visible light source may image the finger at different angles, and therefore a better imaging effect may be obtained in S307.

In FIG. 16, two non-visible light sources with wavelengths of λ1 and λ2 are taken as examples to describe a fingerprint identification method, and in actual application, more than two non-visible light sources and more than two light emitting wave bands may be selected for fingerprint identification according to an actual application scenario. FIG. 16 shows a flowchart of a fingerprint identification method using dual light sources and dual light emitting wave bands. The fingerprint identification method includes the following steps:

S401, pressing, by an object, a fingerprint capturing area of a display screen;

S402, enabling a finger approaching detection mode, performing imaging based on signal light scattered and/or reflected from an object above the fingerprint capturing area when a non-visible light source illuminates the fingerprint capturing area, and determining whether an object is approaching;

S403, determining whether an object presses the display screen by pressing detection;

S404, if it is determined that an object is approaching, determining, according to a result of the pressing detection, whether pressing of the object is finger pressing or foreign body mistouching;

S405, if it is determined that the pressing of the object is the finger pressing, enabling a fingerprint detection mode;

S406, controlling, by a fingerprint sensor, a first non-visible light source with a light emitting wave band of λ1 to actively emit light, and performing imaging based on the non-visible light emitted by the first non-visible light source scattered and/or reflected by the finger, to obtain a first fingerprint image;

S407, controlling, by the fingerprint sensor, a second non-visible light source with a light emitting wave band of λ2 to actively emit light, and performing imaging based on non-visible light emitted by the second non-visible light source scattered and/or reflected by the finger, to obtain a second fingerprint image; and S408, performing fingerprint identification according to a difference between the first fingerprint image and the second fingerprint image under different light emitting wave bands, and distinguishing between real and fake fingers.

In FIGS. 14 to 16, the fingerprint sensor controls the non-visible light source to actively emit light, which may be referred to the content of FIG. 13, and for the sake of brevity, it will not be repeatedly described herein. In addition, the embodiments shown in FIGS. 15 and 16 include two non-visible light sources; in the finger approaching detection mode, instead of requiring a clear fingerprint image, whether the finger is approaching is required to be determined, and one non-visible light source may be configured for approaching detection, or the two non-visible light sources may be configured for approaching detection simultaneously, which is not limited in this embodiment.

It should be noted that specific examples in embodiments of the present application are merely intended to help a person skilled in the art better understand the embodiments of the present application, rather than for limiting the scope of the present application. A person skilled in the art can make various improvements and modifications on the basis of the foregoing embodiments, and these improvements or modifications fall within the protection scope of the present application.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. An optical fingerprint identification apparatus, applied to an electronic device having a display screen, comprising:
more than one non-visible light source, wherein each non-visible light source has a light emitting wave band, different non-visible light sources have different light emitting wave bands, and the different light emitting wave bands is used to distinguish between the real finger and the fake finger and foreign object, the non-visible light source is configured to emit non-visible light to a human finger to provide excitation light for fingerprint identification, the non-visible light source and the display screen are disposed horizontally side by side under a cover glass of the electronic device, the non-visible light source is located outside the display screen;
an optical component, disposed under a fingerprint detecting area of the display screen, and configured to receive signal light scattered and reflected by the human finger; and
a fingerprint sensor, disposed under the optical component, and configured to perform imaging based on the signal light passing through the optical component, wherein a working wave band of the fingerprint sensor is corresponding to a light emitting wave band of the non-visible light source;
wherein the non-visible light source is disposed on at least one side of a universal serial bus (USB) interface of the electronic device on the plane where the USB interface is located that is parallel to the display screen, and the USB interface and the non-visible light source is disposed at a central position of a lower edge of the electronic device;
wherein the optical component comprises: at least one lens and a support;
the lens is configured to converge the signal light and direct the signal light to the fingerprint sensor; and
the support is attached to the bottom surface of the display screen, interior of the support has accommodation space to accommodate the lens, and the support is configured to fix the lens between the display screen and the fingerprint sensor, so that there is a gap between the lens and the display screen, and there is a gap between the lens and the fingerprint sensor;
wherein the optical fingerprint identification apparatus comprises two operating modes of a finger approaching detection mode and a fingerprint detection mode;
in the finger approaching detection mode, the non-visible light source periodically and intermittently emits light to detect whether a finger is approaching;
in the finger approaching detection mode, a first driving current is configured to drive the non-visible light source to actively emit light, and the non-visible light source has a first light emitting period and a first light emitting time;
in the fingerprint detection mode, a second driving current is configured to drive the non-visible light source to actively emit light, and the non-visible light source has a second light emitting period and a second light emitting time; and
the second period is greater than the first period, the second light emitting time is greater than the first light emitting time, and the second driving current is greater than the first driving current.

2. The optical fingerprint identification apparatus according to claim 1, wherein the optical fingerprint identification apparatus further comprises a filter disposed between the optical component and the fingerprint sensor.

3. The optical fingerprint identification apparatus according to claim 1, wherein the display screen includes an organic light-emitting diode (OLED) display screen.

4. The optical fingerprint identification apparatus according to claim 1, wherein the optical component comprises a collimator array, and the collimator array comprises a plurality of collimating holes configured to collimate the signal light and direct the signal light to the fingerprint sensor.

5. The optical fingerprint identification apparatus according to claim 1, wherein the optical component comprises a microlens array and a diaphragm array disposed under the microlens array;
the microlens array comprises a plurality of microlenses configured to converge the signal light;
the diaphragm array comprises a plurality of diaphragms, wherein the diaphragms are in corresponding to the micro lenses, and the diaphragms are configured to direct the signal light converged by the micro lenses to the fingerprint sensor.

6. The optical fingerprint identification apparatus according to claim 1, wherein the fingerprint sensor comprises a driving unit electrically connected to the non-visible light source, and is configured to directly control the non-visible light source to actively emit light, and the driving unit is configured to directly control the more than one non-visible light source to actively emit light.

7. The optical fingerprint identification apparatus according to claim 1, wherein the optical fingerprint identification apparatus further comprises a control module, and the control module is electrically connected to the non-visible light source and the fingerprint sensor;
the fingerprint sensor is communicatively connected to the control module, and is configured to indirectly control the non-visible light source to actively emit light through the control module, and the fingerprint sensor is configured to directly control the more than one non-visible light source to actively emit light.

8. The optical fingerprint identification apparatus according to claim 1, wherein the fingerprint sensor comprises a plurality of pixel units, part of the pixel units are configured to form images based on the signal light in the finger approaching detection mode; and
all of the pixel units are configured to form images based on the signal light in the fingerprint detection mode.

9. The optical fingerprint identification apparatus according to claim 1, wherein the more than one non-visible light source emit light separately, and the human finger is imaged in different wave bands to obtain different imaging features.

10. The optical fingerprint identification apparatus according to claim 1, wherein the optical component comprises at least one camera lens, a lens barrel and a lens holder;
the camera lens is configured to converge the signal light and direct the signal light to the fingerprint sensor;
the lens barrel is configured to accommodate the camera lens; and
the lens holder is configured to fix the lens barrel.

11. The optical fingerprint identification apparatus according to claim 1, wherein the display screen comprises a display module and a backlight module, and the backlight module is capable of transmitting the non-visible light emitted by the non-visible light source.

12. An electronic device comprising a display screen and an optical fingerprint identification apparatus, wherein the display screen is configured to display and detect an input signal;

and the optical fingerprint identification apparatus comprises:

more than one non-visible light source, wherein each non-visible light source has a light emitting wave band, different non-visible light sources have different light emitting wave bands, and the different light emitting wave bands is used to distinguish between the real finger and the fake finger and foreign object, the non-visible light source is configured to emit non-visible light to a human finger to provide excitation light for fingerprint identification, the non-visible light source and the display screen are disposed horizontally side by side under a cover glass of the electronic device, the non-visible light source is located outside the display screen;

an optical component, disposed under a fingerprint detecting area of the display screen, and configured to receive signal light scattered and reflected by the human finger; and a fingerprint sensor, disposed under the optical component, and configured to perform imaging based on the signal light passing through the optical component, wherein a working wave band of the fingerprint sensor is corresponding to light emitting wave band of the non-visible light source;

wherein the non-visible light source is disposed on at least one side of a universal serial bus (USB) interface of the electronic device on the plane where the USB interface is located that is parallel to the display screen, and the USB interface and the non-visible light source is disposed at a central position of a lower edge of the electronic device;

wherein the optical component comprises: at least one lens and a support;

the lens is configured to converge the signal light and direct the signal light to the fingerprint sensor; and the support is attached to the bottom surface of the display screen, interior of the support has accommodation space to accommodate the lens, and the support is configured to fix the lens between the display screen and the fingerprint sensor, so that there is a gap between the lens and the display screen, and there is a gap between the lens and the fingerprint sensor;

wherein the optical fingerprint identification apparatus comprises two operating modes of a finger approaching detection mode and a fingerprint detection mode;

in the finger approaching detection mode, the non-visible light source periodically and intermittently emits light to detect whether a finger is approaching;

in the finger approaching detection mode, a first driving current is configured to drive the non-visible light source to actively emit light, and the non-visible light source has a first light emitting period and a first light emitting time;

in the fingerprint detection mode, a second driving current is configured to drive the non-visible light source to actively emit light, and the non-visible light source has a second light emitting period and a second light emitting time; and the second period is greater than the first period, the second light emitting time is greater than the first light emitting time, and the second driving current is greater than the first driving current.

13. A fingerprint identification method applied to an electronic device, the electronic device having an optical fingerprint identification apparatus and a fingerprint identification function, comprising:

enabling a finger approaching detection mode, performing imaging based on signal light above a fingerprint capturing area of the electronic device, wherein in the finger approaching detection mode, more than one non-visible light source periodically and intermittently emit light to detect whether a finger is approaching;

determining whether there is an object pressing the fingerprint capturing area; and enabling a fingerprint detection mode to perform fingerprint identification if it is an object pressing;

wherein each non-visible light source has a light emitting wave band, different non-visible light sources have different light emitting wave bands, and the different light emitting wave bands is used to distinguish between the real finger and the fake finger and foreign object, the non-visible light source and a display screen are disposed horizontally side by side under a cover glass of the electronic device, the non-visible light source is located outside the display screen;

the non-visible light source is disposed on at least one side of a universal serial bus (USB) interface of the electronic device on the plane where the USB interface is located that is parallel to the display screen, and the USB interface and the non-visible light source is disposed at a central position of a lower edge of the electronic device;

wherein the optical component comprises: at least one lens and a support;

the lens is configured to converge the signal light and direct the signal light to the fingerprint sensor; and the support is attached to the bottom surface of the display screen, interior of the support has accommodation space to accommodate the lens, and the support is configured to fix the lens between the display screen and the fingerprint sensor, so that there is a gap between the lens and the display screen, and there is a gap between the lens and the fingerprint sensor;

wherein the optical fingerprint identification apparatus comprises two operating modes of a finger approaching detection mode and a fingerprint detection mode;

in the finger approaching detection mode, the non-visible light source periodically and intermittently emits light to detect whether a finger is approaching;

in the finger approaching detection mode, a first driving current is configured to drive the non-visible light source to actively emit light, and the non-visible light source has a first light emitting period and a first light emitting time;

in the fingerprint detection mode, a second driving current is configured to drive the non-visible light source to actively emit light, and the non-visible light source has a second light emitting period and a second light emitting time; and the second period is greater than the first period, the second light emitting time is greater than the first light emitting time, and the second driving current is greater than the first driving current.

14. The fingerprint identification method according to claim 13, wherein the enabling a fingerprint detection mode to perform fingerprint identification comprising:
   determining whether the object is finger or foreign body;
   if it is determined that pressing of the object is the finger pressing, performing fingerprint identification.

15. The fingerprint identification method according to claim 14, wherein determining whether the object is finger or foreign body further comprising:
   providing a first non-visible light source with a first light emitting wave band to actively emit light to provide excitation light for fingerprint identification, and obtaining a first fingerprint image;
   providing a second non-visible light source with a second light emitting wave band to actively emit light to provide excitation light for fingerprint identification, and obtaining a second fingerprint image; and
   performing fingerprint identification according to a difference between the first fingerprint image and the second fingerprint image, and distinguishing between real and fake fingers.

\* \* \* \* \*